R. H. MOORE.
STEERING DEVICE.
APPLICATION FILED MAR. 24, 1921.
1,436,773.
Patented Nov. 28, 1922.
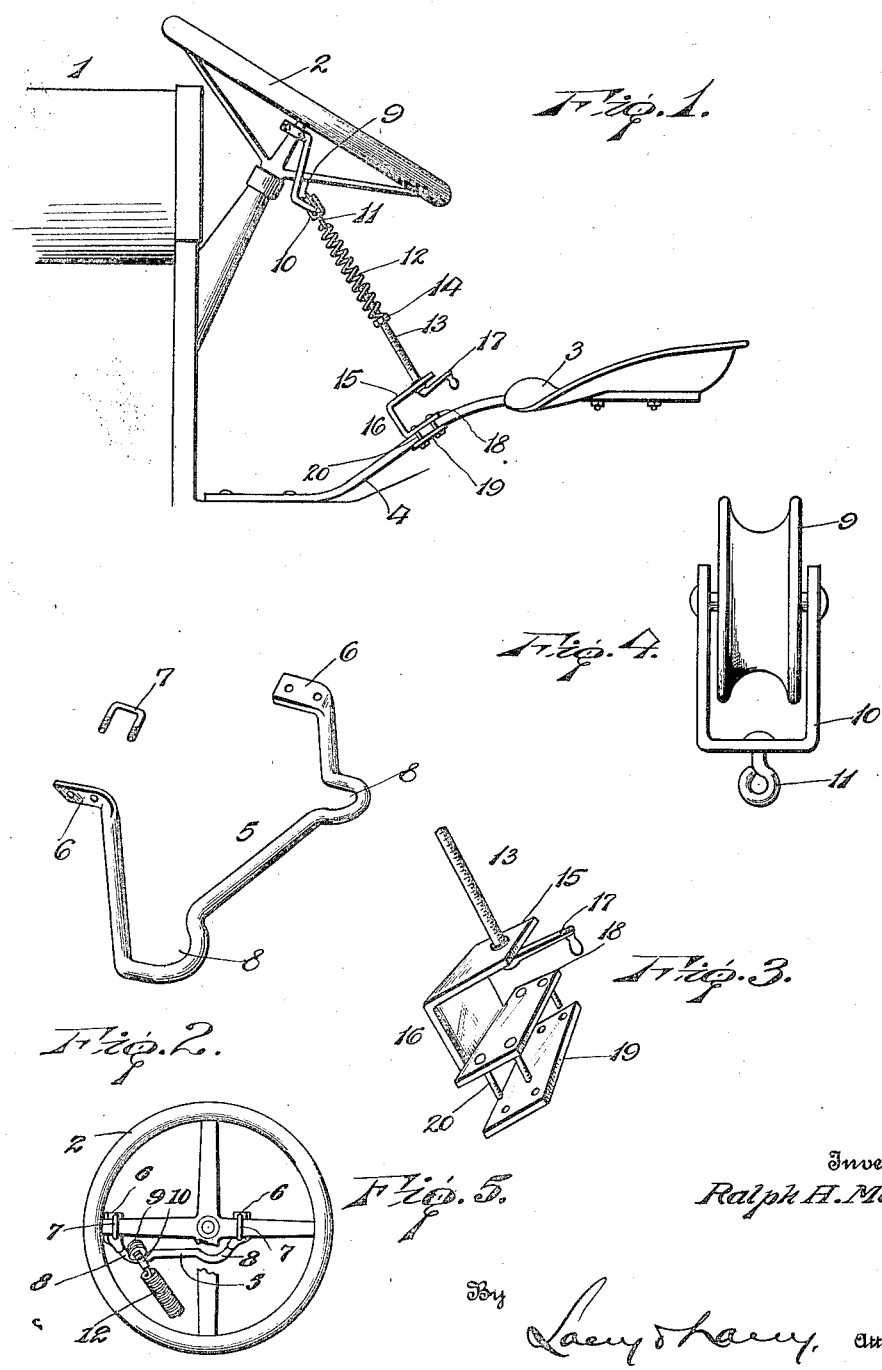
Inventor
Ralph H. Moore.
By
Laery & Laery, Attorneys Patented Nov. 28, 1922.

1,436,773

UNITED STATES PATENT OFFICE.

RALPH H. MOORE, OF AURORA, NEBRASKA.

STEERING DEVICE.

Application filed March 24, 1921. Serial No. 455,120.

*To all whom it may concern:*

Be it known that I, RALPH H. MOORE, a citizen of the United States, residing at Aurora, in the county of Hamilton and State of Nebraska, have invented certain new and useful Improvements in Steering Devices, of which the following is a specification.

This invention has for its object the provision of simple and inexpensive means which may be readily applied to the steering wheel of a tractor and effectually hold the steering mechanism in such position that the tractor will travel straight ahead. In using a well-known tractor for plowing, the right forward wheel travels in a previously made furrow and runs against the wall of the furrow so that there is a tendency of said wheel to swing backwardly and thereby steer the tractor to the right. My invention provides means whereby the right forward wheel of the tractor will be held normally to its rectilinear path but may be permitted to swing out of said path readily when it is desired to turn the tractor. The invention is illustrated in the accompanying drawings and will be hereinafter fully set forth.

In the drawings—

Figure 1 is an elevation of a portion of a tractor having my attachment applied thereto;

Fig. 2 is a detail perspective view of the track which forms one element of the device;

Fig. 3 is a detail perspective view of the bracket which is secured upon the seat standard and supports a tension rod;

Fig. 4 is a detail view of a roller which forms a part of the device.

In the drawings, the reference numeral 1 indicates a portion of a tractor, 2 denotes the steering wheel of the same, and 3 indicates the seat supported by a seat standard 4.

In carrying out my invention, I secure to the spokes of the steering wheel which are normally at a right angle to the line of travel a track bar 5 which is provided at its ends with clamping plates 6 adapted to fit against the spoke, one of said plates being fitted to the spoke at the outer end thereof and the other plate being secured to the spoke immediately adjacent the steering column or at the center of the steering wheel. Clips, such as shown at 7, are fitted around the spokes and through the clamping plates and secured in position by ordinary nuts in an obvious manner so as to firmly secure the track to the steering wheel. Adjacent the ends of the track are seats 8 which are adapted to be engaged by the pulley or roller 9 and thereby normally hold said roller against movement. The roller 9 is mounted in a stirrup 10 and the body of the track 5 passes between the head of the stirrup and the roller so that the grooved periphery of the roller will engage the forward side or edge of the track, as shown in Fig. 1. The stirrup 10 carries a hook or eye 11 to which is secured one end of a coiled spring 12, the opposite end of the said spring being fitted about a tension rod 13 and secured to a nut 14 mounted on the said rod. The tension rod is rotatably mounted in the upper forward web or flange 15 of a bracket 16 and is equipped with a crank or other form of handle 17 in rear of the said web 15 so that the rod may be easily rotated to effect travel of the nut 14 and thereby adjust the tension of the spring. The bracket 16 includes a web or flange 18 which bears against the seat standard 4 and constitutes one member of a clamp whereby the bracket is secured upon the standard. A mating clamping plate 19 is fitted against the under or rear side of the seat standard 4 and clamping bolts 20 are inserted through the members 18 and 19 at the edges of the standard to secure the said members firmly against the opposite sides of the standard and thereby support the bracket firmly in position.

Normally the roller 9 is held in the seat 8 at the left hand end of the track 5 and the spring 12 is then under tension exerting a pull upon the left side of the steering wheel in opposition to the draft upon the forward right wheel of the tractor resulting from the position of said wheel against the wall of the furrow. The tractor will thus be caused to follow a straight path forward, but, if it be desired to make a turn, the steering wheel 2 may be operated in the usual manner and the tractor easily guided. If the turn be to the left, the outer end of the track 5 will swing rearwardly and the tension of the spring 12 will be relaxed. If the turn be to the right, the outer end of the track will swing forwardly and the tension of the spring 12 will be increased until the track has assumed such a position that the roller 9 may clear the inner side of the seat 8, whereupon the tension of the spring will cause the roller to run along the track to the inner seat 8 and engage said seat, but inasmuch as said seat is immediately adjacent the steering column or center of the steering wheel the tension of the spring will be relaxed and it will exert no perceptible influence upon the steering wheel. After the turn has been made and the tractor has been again set to travel straight forward, the roller may be manually returned along the track 5 to the outer seat 8 and will then again exercise its function of holding the forward steering wheel against backward swinging movement.

It will be readily noted that my device is exceedingly simple in the construction and arrangement of its parts and may be readily applied to the steering devices of the tractor without necessitating any change in the construction thereof. It may be easily manipulated and does not interfere in any way with the usual operation of the steering devices and by reason of its simplicity it is not apt to get out of order and may be produced and applied at a very low cost.

Having thus described the invention, what is claimed as new is:

1. The combination with the steering wheel of a tractor, of a track secured to the said wheel with one end at the left side thereof and the other end adjacent the center of the same, and a tension device operatively engaged with the said track and normally acting upon the outer end thereof and shiftable along the track to reduce the tension exerted thereon.

2. The combination with the steering wheel of a tractor, of a track secured to the said wheel with one end at the left side thereof and the other end adjacent the center of the same, the track being provided with seats at its ends, a roller mounted to travel along the track and engage the seats at the ends of the same, and yieldable means for holding the roller to the track and normally in the outer seat thereof.

3. The combination with a steering wheel, and the seat standard of a tractor, of a track secured upon the steering wheel at the left side thereof, seats at the ends of said track, a roller mounted to travel upon the track and engage the said seats, a spring connected with said roller, and means on the seat standard for securing the said spring.

4. The combination with the steering wheel, and seat standard of a tractor, of a track secured upon the steering wheel at the left side of the same, seats at the end of said track, a bracket on the seat standard, a tension rod mounted in said bracket, a roller mounted to travel upon the track and engage the seats at the ends of the same, and a spring having one end connected with the said roller and the other end connected with said tension rod.

In testimony whereof I affix my signature.

RALPH H. MOORE. [L. S.]